(12) United States Patent
Tsai (10) Patent No.: US 8,125,199 B2
(45) Date of Patent: Feb. 28, 2012

(54) LOAD CONTROL MODULE

(75) Inventor: Wen-Kuei Tsai, Taipei County (TW)

(73) Assignee: GE Investment Co., Ltd., Taipei (TW)

( * ) Notice: Subject to any disclaimer, the term of this patent is extended or adjusted under 35 U.S.C. 154(b) by 378 days.

(21) Appl. No.: 12/507,075

(22) Filed: Jul. 22, 2009

(65) Prior Publication Data

US 2010/0023177 A1      Jan. 28, 2010

(30) Foreign Application Priority Data

Jul. 22, 2008   (TW) ................................ 97127861 A (51) Int. Cl.
*G05F 1/00*   (2006.01)
(52) U.S. Cl. ........................................................ 323/222
(58) Field of Classification Search .................. 323/222, 323/234; 307/104, 141; 362/84
See application file for complete search history.

(56) References Cited

U.S. PATENT DOCUMENTS

| | | | | |
|---|---|---|---|---|
| 5,986,439 | A * | 11/1999 | Pletta et al. ...................... | 322/59 |
| 6,075,342 | A * | 6/2000 | Koenck ........................... | 320/125 |
| 6,963,175 | B2 * | 11/2005 | Archenhold et al. .......... | 315/291 |
| 7,714,464 | B2 * | 5/2010 | Tsai et al. ...................... | 307/140 |

FOREIGN PATENT DOCUMENTS

| | | |
|---|---|---|
| DE | 19917091 C1 | 6/2000 |
| EP | 2031942 | 3/2009 |
| EP | 2031942 A2 | 3/2009 |
| JP | 2008-166165 | 7/2008 |
| JP | 2009-055775 | 3/2009 |

OTHER PUBLICATIONS

"Search Report of European counterpart application", issued on Dec. 11, 2009, p. 1-p. 6.

* cited by examiner

*Primary Examiner* — Adolf Berhane
*Assistant Examiner* — Yemane Mehari
(74) *Attorney, Agent, or Firm* — Muncy, Geissler, Olds & Lowe, PLLC (57) ABSTRACT

A load control module suitable for an electrical equipment is disclosed, wherein the electrical equipment is coupled to a switch. The load control module includes an energy storage unit, a microprocessor, and a pulse control unit. The energy storage unit still outputs a reserved voltage for a predetermined time when the switch is turned off. Besides, the energy storage unit switches the level of an indication signal according to the on/off state of the switch. Along with the change in the level of the indication signal, the microprocessor regulates the duty cycle of a modulation signal through different control methods respectively within and without a fine tuning time. Thereby, the load control module regulates the level of a control voltage according to the on/off state of the switch so as to achieve a diversified control function.

10 Claims, 6 Drawing Sheets

LOAD CONTROL MODULE

CROSS-REFERENCE TO RELATED APPLICATION

This application claims the priority benefit of Taiwan application serial no. 97127861, filed on Jul. 22, 2008. The entirety of the above-mentioned patent application is hereby incorporated by reference herein and made a part of specification.

BACKGROUND OF THE INVENTION

1. Field of the Invention

The present invention generally relates to a load control module, in particular, to a load control module which can generate a control voltage of different levels according to the changes in the switching time point and the switching speed of a switch.

2. Description of Related Art

The human civilization has leaped forward along with the discovery of electricity made by Benjamin Franklin in 18th century. The applications of electricity not only facilitate the productions of social materials but also affect our daily life greatly. For example, various electrical equipments used in our daily life, such as illuminating devices, air-conditioning modules, fans, and food heaters etc, are all electrically powered.

Figure 1:
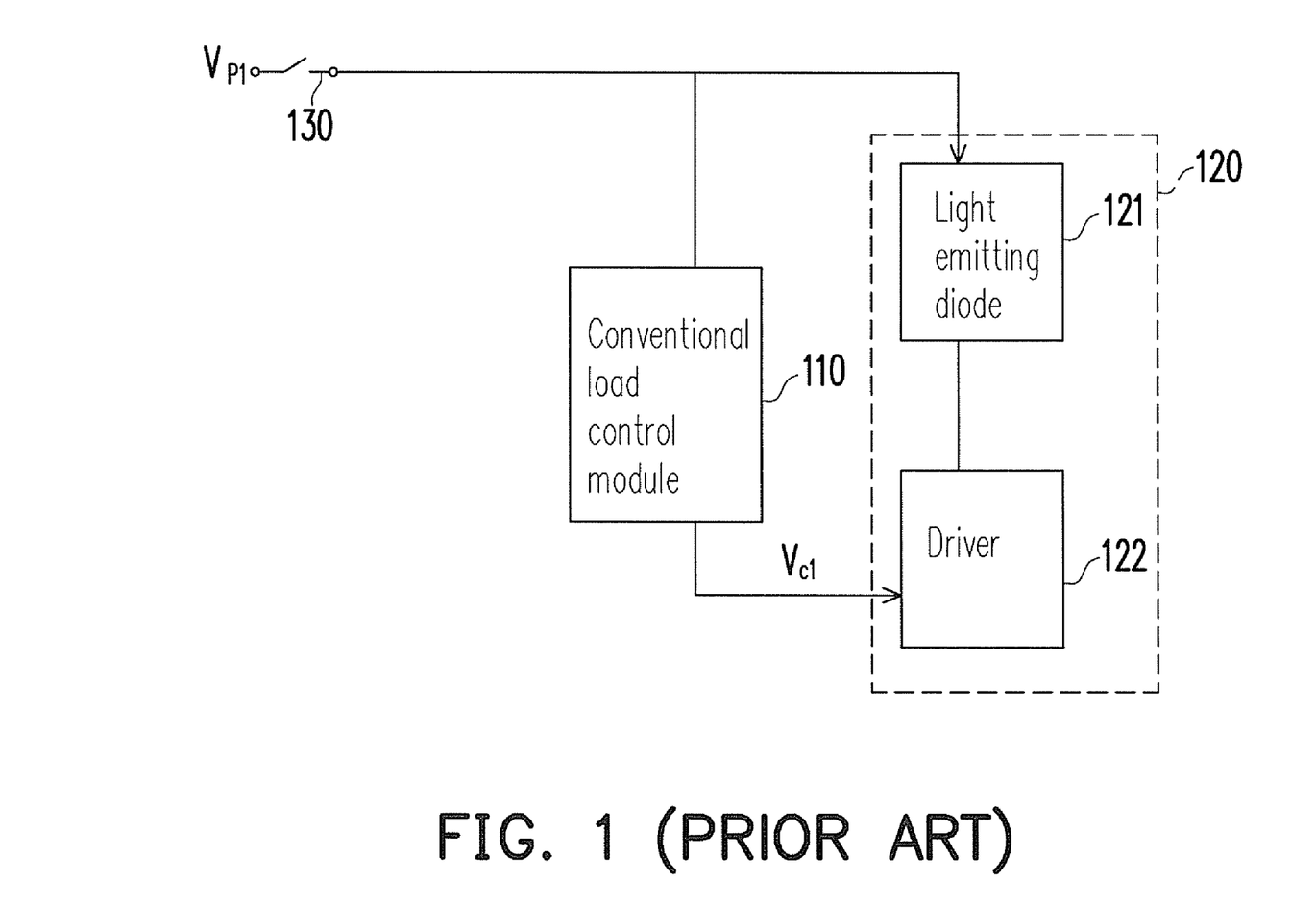
FIG. 1 is a block diagram of an illuminating device in actual application.

The operation of an electrical equipment is usually accomplished through the interactive control of a switch and a load control module. For example, FIG. 1 is a block diagram of an illuminating device in actual application. The illuminating device 120 includes a light-emitting diode (LED) 121 and a driver 122. Referring to FIG. 1, the conventional load control module 110 and the LED 121 receive a supply voltage $V_{P1}$ from the switch 130 when the switch 130 is turned on, and then the illuminating device 120 operates normally so that the LED 121 is driven by the supply voltage $V_{P1}$.

On the other hand, the conventional load control module 110 converts the supply voltage $V_{P1}$ received from the switch 130 into a control voltage $V_{C1}$ having a constant level. The driver 122 regulates the light source emitted by the LED 121 to a constant brightness according to the control voltage $V_{C1}$. Contrarily, when the switch 130 is turned off, the LED 121 and the conventional load control module 110 is not supplied with any electricity, so that the illuminating device 120 cannot provide the light source therefore remains in a non-working state.

As described above, the illuminating device 120 switches between a normal operation mode and a non-working mode under the interactive control of the switch 130 and the conventional load control module 110. Accordingly, the light source generated by the illuminating device 120 switches between full brightness and full darkness. In other words, the illuminating device 120 cannot generate a light source of diversified brightness under the control of the switch 130 and the conventional load control module 110.

In overview, the electrical performance of an illuminating device or an electrical equipment is usually restricted under the control of a switch and a conventional load control module therefore cannot meet consumers' requirement. Thereby, how a load control module can operate in coordination with a switch to achieve a diversified control function has become one of the most critical subjects in the development of load control module.

SUMMARY OF THE INVENTION

Accordingly, the present invention is directed to a load control module which can generate a control voltage of different levels along with the changes in the switching time point and the switching speed of a switch. Thereby, the load control module in the present invention can operate in coordination with the switch to achieve a diversified control function.

The present invention is directed to a load control module suitable for an electrical equipment, wherein the electrical equipment is coupled to a terminal of a switch, and the other terminal of the switch receives a supply voltage. The load control module includes an energy storage unit, a microprocessor, and a pulse control unit. The energy storage unit transforms a supply voltage and outputs a reserved voltage and an indication signal having a first level when the switch is turned on. Besides, the energy storage unit still outputs the reserved voltage for a predetermined time and switches the indication signal to a second level when the switch is turned off.

The microprocessor is activated according to the reserved voltage so as to regulate the duty cycle of a modulation signal within and without a fine tuning time respectively through different control methods. During the fine tuning time, the microprocessor increases the duty cycle of the modulation signal constantly until the duty cycle of the modulation signal reaches an optimal value or the indication signal is switched to the second level. Out of the fine tuning time, the microprocessor switches the duty cycle of the modulation signal to one of a plurality of predetermined duty cycles according to the indication signal of the second level.

On the other hand, the pulse control unit regulates the level of the control voltage according to the duty cycle of the modulation signal and outputs the control voltage to regulate the characteristic parameters of the electrical equipment. Thus, the load control module can operate in coordination with the switch to execute a diversified control function.

According to an embodiment of the present invention, the load control module further includes a bus, an over-temperature protection unit, and a feedback unit. The bus has a first signal line and a third signal line, wherein a terminal of the first signal line and a terminal of the third signal line are respectively coupled to the microprocessor. The microprocessor resets the fine tuning time, the optimal duty cycle, and the predetermined duty cycles thereof according to a signal transmitted via the first signal line.

In addition, the over-temperature protection unit is activated according to the reserved voltage to detect the temperature of the electrical equipment and generate a temperature alarm signal. On the other hand, the microprocessor determines whether to re-regulate the duty cycle of the modulation signal according to the temperature alarm signal. The feedback unit generates a feedback signal according to the level of the control voltage, and the microprocessor determines whether the pulse control unit operates normally according to the feedback signal.

In the present invention, an energy storage unit is adopted and which allows the load control module to operate for a predetermined time even when the switch is turned off. In addition, the energy storage unit switches the level of an indication signal according to the on/off state of the switch so that the microprocessor can regulate the duty cycle of a modulation signal through different control methods respectively within and without a fine tuning time according to the level of the indication signal. Thereby, the load control module in the present invention can generate a control voltage of different levels according to the on/off state of the switch so as to achieve a diversified control function.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF THE EMBODIMENTS

Reference will now be made in detail to the present preferred embodiments of the invention, examples of which are illustrated in the accompanying drawings. Wherever possible, the same reference numbers are used in the drawings and the description to refer to the same or like parts.

Figure 2:
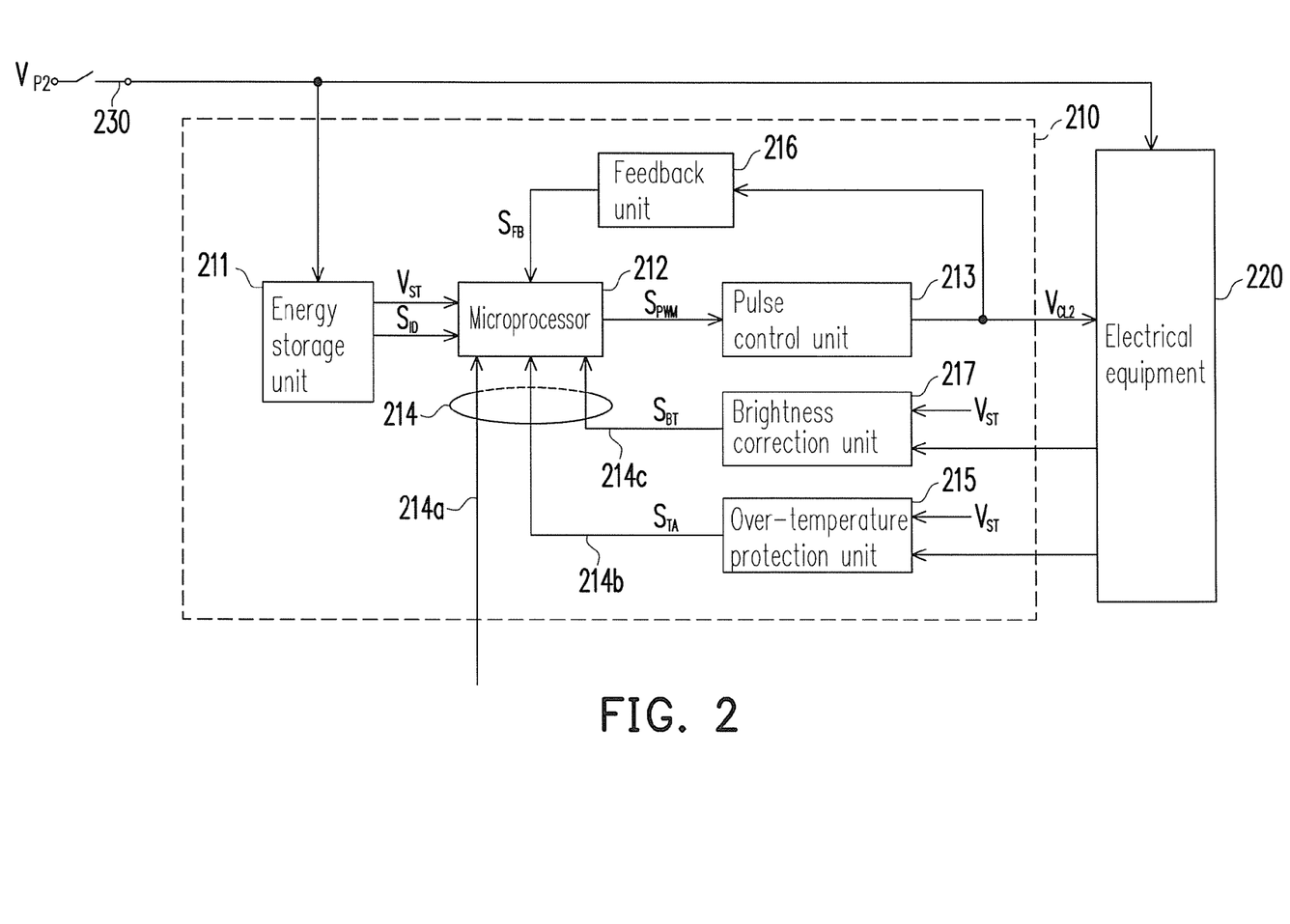
FIG. 2 is a block diagram of a load control module according to an embodiment of the present invention.

FIG. 2 is a block diagram of a load control module according to an embodiment of the present invention. The load control module 210 is suitable for an electrical equipment 220, wherein the electrical equipment 220 is coupled to a terminal of a switch 230. Referring to FIG. 2, the load control module 210 includes an energy storage unit 211, a microprocessor 212, and a pulse control unit 213. The energy storage unit 211 is coupled to a terminal of the switch 230. The microprocessor 212 is coupled to the energy storage unit 211. The pulse control unit 213 is coupled between the microprocessor 212 and the electrical equipment 220.

When the switch 230 is turned on, the energy storage unit 211 converts a supply voltage $V_{P2}$ received from the switch 230 into a reserved voltage $V_{ST}$ and an indication signal $S_{ID}$ having a first level L1. On the other hand, when the switch 230 is turned off, the energy storage unit 211 still outputs the reserved voltage $V_{ST}$ within a predetermined time $T_P$ and switches the indication signal $S_{ID}$ to a second level L2.

Besides, the microprocessor 212 is activated according to the reserved voltage $V_{ST}$ so as to generate a modulation signal $S_{PWM}$ through different control methods respectively within and without a fine tuning time $T_{FA}$. During the fine tuning time $T_{FA}$, the microprocessor 212 constantly increases the duty cycle of the modulation signal $S_{PWM}$ until the duty cycle of the modulation signal $S_{PWM}$ reaches an optimal value or the indication signal $S_{ID}$ is switched to the second level L2. Contrarily, out of the fine tuning time $T_{FA}$, the microprocessor 212 switches the duty cycle of the modulation signal $S_{PWM}$ to one of a plurality of predetermined duty cycles according to the indication signal $S_{ID}$ of the second level L2. Thus, the pulse control unit 213 outputs a corresponding control voltage $V_{CL2}$ according to the duty cycle of the modulation signal $S_{PWM}$ for regulating the characteristic parameters of the electrical equipment 220.

The operation mechanism of the load control module 210 will be further described below with reference to the waveform timing diagrams illustrated in FIG. 3A and FIG. 3B.

Figure 3A:
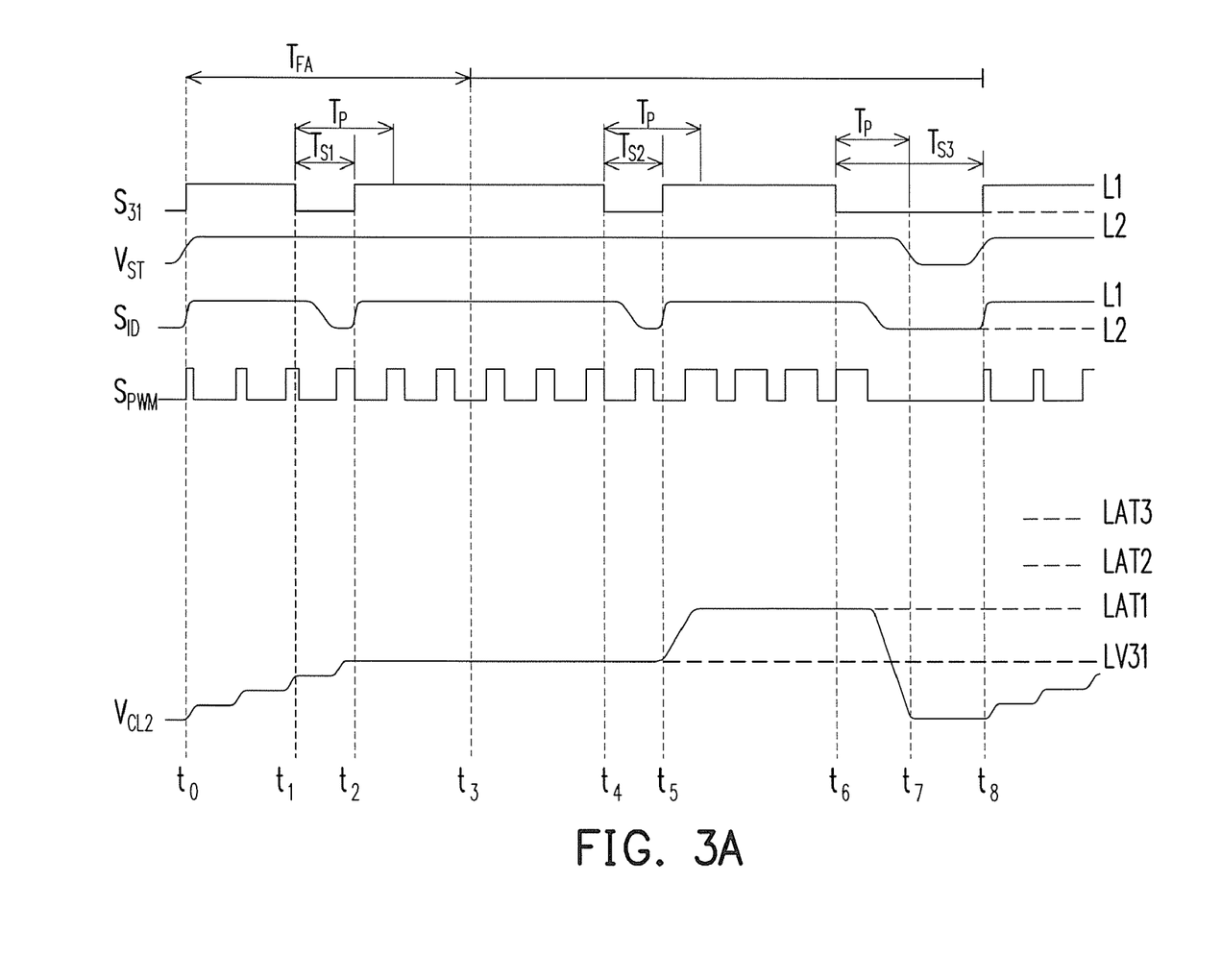
FIG. 3A and FIG. 3B are respectively a waveform timing diagram of the embodiment illustrated in FIG. 2.

Referring to FIG. 2 and FIG. 3A, the switch 230 is turned on/off according to a switch signal S31. For example, the switch 230 is turned on when the switch signal S31 is switched to the first level L1. Contrarily, the switch 230 is turned off when the switch signal S31 is switched to the second level L2. In the present embodiment, it is assumed that the first level L1 is logic 1 and the second level L2 is logic 0, and for the convenience of description, following embodiments will all be described based on foregoing assumptions.

Referring to FIG. 2 and FIG. 3A again, first, the switch 230 is turned on at time point $t_0$, so that the energy storage unit 211 starts to output the reserved voltage $V_{ST}$ and the indication signal $S_{ID}$ with the first level L1. After that, the switch 230 is sequentially switched at the time points $t_1$ and $t_2$. Since the time $T_{S1}$ for the switch 230 to remain turned off is shorter than the predetermined time $T_P$, the energy storage unit 211 still outputs the reserved voltage $V_{ST}$ between the time points $t_1$ and $t_2$ and switches the indication signal $S_{ID}$ to the second level L2. Similarly, the energy storage unit 211 also outputs the reserved voltage $V_{ST}$ between the time points $t_4$ and $t_5$ and switches the indication signal $S_{ID}$ to the second level L2.

Since the microprocessor 212 is activated according to the reserved voltage $V_{ST}$, the microprocessor 212 remains turned-on between the time points $t_0$ and $t_7$ and constantly changes the duty cycle of the modulation signal $S_{PWM}$. During the fine tuning time $T_{FA}$, the microprocessor 212 constantly increases the duty cycle of the modulation signal $S_{PWM}$ until the indication signal $S_{ID}$ is switched to the second level L2 between the time points $t_1$ and $t_2$. Contrarily, along with the increase of the duty cycle of the modulation signal $S_{PWM}$, the pulse control unit 213 gradually increases the level of the control voltage $V_{CL2}$ and sustains it at a level LV31.

Out of the fine tuning time $T_{FA}$, namely, after the time point $t_3$, the microprocessor 212 switches the duty cycle of the modulation signal $S_{PWM}$ to one of a plurality of predetermined duty cycles according to the indication signal $S_{ID}$ with the second level L2. Thus, the pulse control unit 213 allows the control voltage $V_{CL2}$ to be switched to one of a plurality of predetermined levels.

For example, it is assumed that the modulation signal $S_{PWM}$ generated by the microprocessor 212 has 3 different predetermined duty cycles PD1~PD3 and these predetermined duty cycles PD1~PD3 are corresponding to 3 different predetermined levels LAT1~LAT3. Between the time points $t_3$ and $t_6$, the duty cycle of the modulation signal $S_{PWM}$ is switched to the predetermined duty cycle PD1 when the microprocessor 212 receives the indication signal $S_{ID}$ with the second level L2. Contrarily, the pulse control unit 213 correspondingly generates the control voltage $V_{CL2}$ having the predetermined level LAT1.

Thereafter, the switching of the switch 230 at the time points $t_6$ and $t_8$ causes the microprocessor 212 to be disabled at the time point $t_7$. Besides, at the time point $t_8$, the microprocessor 212 is activated again to repeat the operation between the time points $t_0$ and $t_8$. It should be noted that when the level of the reserved voltage $V_{ST}$ is increased to a predetermined level (for example, $0.5*V_{ST}$), the microprocessor 212 performs a reset operation. In other words, the microprocessor 212 performs the reset operation while it is re-started.

Figure 3B:
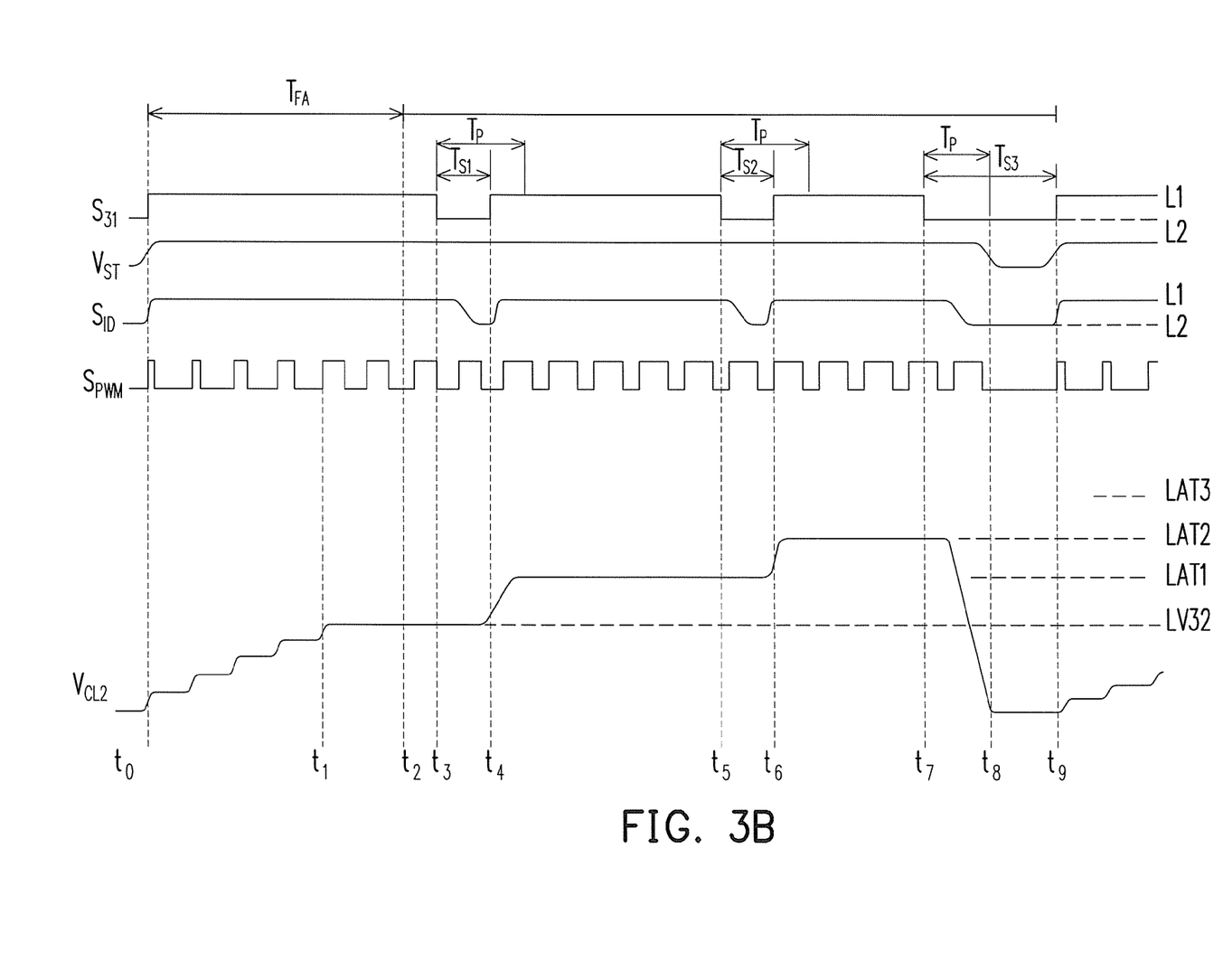

On the other hand, referring to the waveform timing diagram in FIG. 3B, similarly, the switch 230 is turned on/off according to the switch signal S31. Besides, along with the switching of the switch 230, the time $T_{S1}$ and $T_{S2}$ for the switch 230 to remain turned-off are respectively shorter than the predetermined time $T_P$. Thus, between the time points $t_0$ and $t_7$, the energy storage unit 211 constantly outputs the reserved voltage $V_{ST}$ and switches the indication signal $S_{ID}$ to the second level L2 during the periods when the switch 230 is turned off.

However, the biggest difference between FIG. 3B and FIG. 3A is that the level of the switch signal S31 is switched at different time points based on the fine tuning time $T_{FA}$ specified by the microprocessor 212. Thus, referring to the waveform timing diagram illustrated in FIG. 3B, during the fine tuning time $T_{FA}$, the microprocessor 212 constantly increases the duty cycle of the modulation signal $S_{PWM}$ until the duty cycle of the modulation signal $S_{PWM}$ is regulated to an optimal duty cycle at the time point $t_1$. Contrarily, along with the constant increase of the duty cycle of the modulation signal $S_{PWM}$, the pulse control unit 213 gradually increases the level of the control voltage $V_{CL2}$ and sustains it at a level LV32. It should be noted that the level LV32 is higher than the level LV31 compared to FIG. 3A.

On the other hand, out of the fine tuning time $T_{FA}$, namely, after the time point $t_2$, the microprocessor 212 switches the modulation signal $S_{PWM}$ to one of a plurality of predetermined duty cycles according to the indication signal $S_{ID}$ of the second level L2. Thus, when the microprocessor 212 receives the indication signal $S_{ID}$ of the second level L2 between the time points $t_3$ and $t_4$, between the time points $t_3$ and $t_4$, the duty cycle of the modulation signal $S_{PWM}$ is switched to the predetermined duty cycle PD1. Accordingly, the pulse control unit 213 correspondingly generates the control voltage $V_{CL2}$ with the predetermined level LAT1.

Similarly, when the microprocessor 212 receives the indication signal $S_{ID}$ of the second level L2 between the time points $t_5$ and $t_6$, duty cycle of the modulation signal $S_{PWM}$ is switched to the predetermined duty cycle PD2. Accordingly, the pulse control unit 213 correspondingly generates the control voltage $V_{CL2}$ with the predetermined level LAT2. After that, because the time $T_{S3}$ for the switch 230 to remain turned-off is longer than the predetermined time $T_P$, the microprocessor 212 is disabled at the time point $t_8$ and is re-started at the time point $t_9$ so as to repeat the operation between the time points $t_0$ and $t_9$.

As described above, when the switch signal S31 is switched to the first level L1 at the time point $t_0$, the load control module 210 constantly regulates the level of the control voltage $V_{CL2}$ within the fine tuning time $T_{FA}$ until the state of the switch 230 is quickly switched by the switch signal S31 or the duty cycle of the modulation signal $S_{PWM}$ is regulated to an optimal value. Thereafter, out of the fine tuning time $T_{FA}$, the load control module 210 regulates the control voltage $V_{CL2}$ according to the indication signal $S_{ID}$ with the second level L2. On the other hand, when the time $T_{S3}$ for the switch 230 to remain turned-off is longer than the predetermined time $T_P$, the load control module 210 is re-started to repeat foregoing operations. Thereby, the load control module 210 can operate in coordination with the switch 230 to allow the electrical equipment 220 to achieve a diversified control function.

For example, when the electrical equipment 220 is an illuminating device, because the level of the control voltage $V_{CL2}$ received during the fine tuning time $T_{FA}$ is constantly changed, the illuminating device constantly increases the brightness of the light source it provides according to the control voltage $V_{CL2}$ until the state of the switch 230 is quickly switched or the light source is adjusted to an optimal brightness according to the optimal duty cycle of the modulation signal $S_{PWM}$.

After that, out of the fine tuning time $T_{FA}$, the illuminating device switches the brightness of the light source thereof between a plurality of predetermined brightness along with the quickly switching of the switch 230. Contrarily, when the time for the switch 230 to remain turned-off is longer than the predetermined time $T_P$ (for example, 2 seconds), the load control module 210 is re-started and operates in coordination with the switch 230 again to regulate the brightness of the light source provided by the illuminating device.

In the conventional technique, the conventional load control module 110 can only switch the illuminating device between full brightness and full darkness by coordinating with the switch 130. While in the present embodiment, the load control module 210 can regulate the brightness of the light source provided by the illuminating device by coordinating with the switch 230. In other words, a switch-controlled electrical equipment can achieve a diversified function control under the control of the load control module 210 in the present embodiment.

Similarly, when the electrical equipment 220 is a food heater, within the fine tuning time $T_{FA}$, the food heater constantly increases the temperature of a heat source it provides according to the level of the control voltage $V_{CL2}$ until the state of the switch 230 is quickly switched or the heat source is increased to an optimal temperature. Thereafter, out of the fine tuning time $T_{FA}$, the food heater switches the temperature of the heat source between a plurality of predetermined temperatures according to the control voltage $V_{CL2}$.

Additionally, when the electrical equipment 220 is an air-conditioner, within the fine tuning time $T_{FA}$, the air-conditioner reduces the indoor temperature according to the level of the control voltage $V_{CL2}$ until the state of the switch 230 is quickly switched or the temperature is adjusted to an optimal temperature. Thereafter, out of the fine tuning time $T_{FA}$, the air-conditioner switches the indoor temperature between a plurality of predetermined temperatures according to the control voltage $V_{CL2}$.

Referring to FIG. 2, the load control module 210 further includes a bus 214, an over-temperature protection unit 215, and a feedback unit 216. The bus 214 has signal lines 214a~214c, wherein an end of each of the signal lines 214a~214c is coupled to the microprocessor 212. The over-temperature protection unit 215 is coupled to the energy storage unit 211 and the other end of the signal line 214. The feedback unit 216 is coupled between the microprocessor 212 and the pulse control unit 213.

A user may load a program into the microprocessor 212 through the signal line 214a. Accordingly, the microprocessor 212 resets the originally specified fine tuning time, optimal duty cycle, and the predetermined duty cycles according to a signal transmitted via the signal line 214a. In addition, the over-temperature protection unit 215 is activated according to the reserved voltage $V_{ST}$. Once activated, the over-temperature protection unit 215 detects the temperature of the electrical equipment 220 and generates a temperature alarm signal $S_{TA}$ according to the detection result. Contrarily, the microprocessor 212 determines whether to re-regulate the duty cycle of the modulation signal $S_{PWM}$ according to the temperature alarm signal $S_{TA}$. Thereby, when the operation temperature of the electrical equipment 220 is too high, the load control module 210 timely regulates the level of the control voltage $V_{CL2}$ according to the temperature alarm signal $S_{TA}$ so as to reduce the power consumption of the electrical equipment 220.

On the other hand, the feedback unit 216 constantly detects the level of the control voltage $V_{CL2}$ and generates a feedback signal $S_{FB}$ according to the level of the control voltage $V_{CL2}$. Similarly, the microprocessor 212 determines whether the pulse control unit 213 operates normally according to the feedback signal $S_{FB}$ so as to control the operation of the pulse control unit 213 in real-time.

Moreover, if the electrical equipment 220 in FIG. 2 is used for providing a light source and the brightness of the light source is changed along with the level change of the control voltage $V_{CL2}$, the load control module 210 further includes a brightness correction unit 217. The brightness correction unit

217 is coupled to the energy storage unit 211 and the other end of the signal line 214c. Besides, the brightness correction unit 217 is activated according to the reserved voltage $V_{ST}$. Once activated, the brightness correction unit 217 detects a moving object in and the brightness of the environment around the electrical equipment 220 by using an internal sensor device thereof and generates a brightness tuning signal $S_{BT}$ according to the detection result. The sensor device in the brightness correction unit 217 includes photo sensor and infrared sensor, and the photo sensor may be a photo-sensitive resistor, or a light emitting transistor etc.

Thereafter, the microprocessor 212 automatically regulates the duty cycle of the modulation signal $S_{PWM}$ according to the brightness tuning signal $S_{BT}$. Accordingly, the brightness of the light source provided by the electrical equipment 220 is regulated based on a specific percentage. Accordingly, when the electrical equipment 220 is in a very bright environment and the brightness correction unit 217 cannot detect any moving object, the load control module 210 automatically adjusts the level of the control voltage $V_{CL2}$ according to the brightness tuning signal $S_{BT}$ so as to finely reduce the brightness of the light source provided by the electrical equipment 220. Contrarily, when the electrical equipment 220 is in an environment of low brightness and the brightness correction unit 217 detects a moving object, the load control module 210 finely increases the brightness of the light source provided by the electrical equipment 220 according to the brightness tuning signal $S_{BT}$.

The internal structures of the energy storage unit 211, the pulse control unit 213, and the over-temperature protection unit 215 will be further described below.

Figure 4:
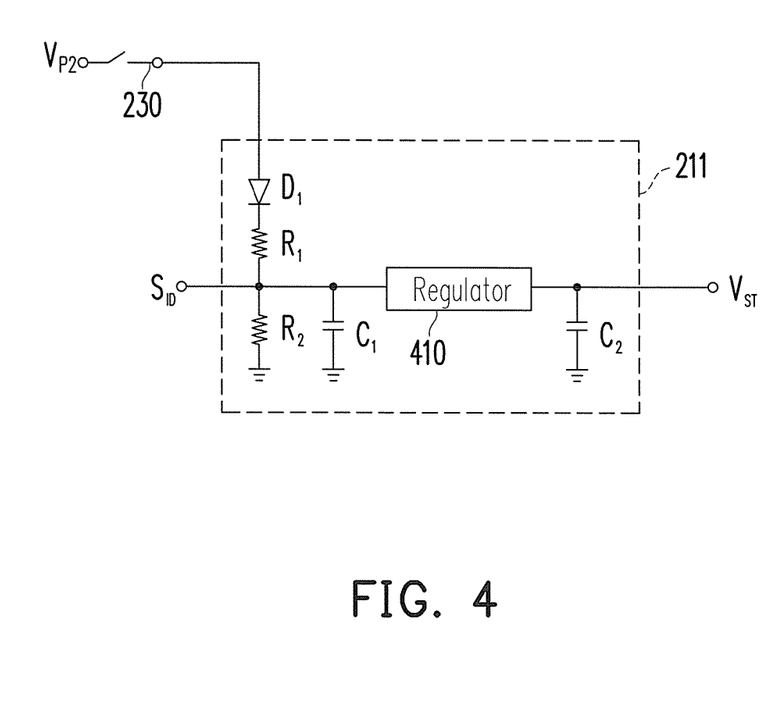
FIG. 4 is a detailed circuit diagram of an energy storage unit according to an embodiment of the present invention.

FIG. 4 is a detailed circuit diagram of an energy storage unit according to an embodiment of the present invention. For the convenience of description, a switch 230 is also illustrated in FIG. 4. Referring to FIG. 4, the energy storage unit 211 includes a diode $D_1$, resistors $R_1 \sim R_2$, capacitors $C_1 \sim C_2$, and a regulator 410. The anode of the diode $D_1$ is coupled to the switch 230. The first terminal of the resistor $R_1$ is coupled to the cathode of the diode $D_1$, and the second terminal thereof is used for generating the indication signal $S_{ID}$. The first terminal of the resistor $R_2$ is coupled to the second terminal of the resistor $R_1$, and the second terminal thereof is coupled to the ground. The first terminal of the capacitor $C_1$ is coupled to the second terminal of the resistor $R_1$, and the second terminal thereof is coupled to the ground. The regulator 410 is coupled to the second terminal of the resistor $R_1$. The first terminal of the capacitor $C_2$ is coupled to the regulator 410, and the second terminal thereof is coupled to the ground.

When the switch 230 is turned on, the supply voltage $V_{P2}$ from the switch 230 is dropped on the resistors $R_1$ and $R_2$ through the diode $D_1$. Thus, the voltage division formed by the resistors $R_1$ and $R_2$ is stored in the capacitor $C_1$ so as to form the indication signal $S_{ID}$ of the first level L1. Besides, the regulator 410 also converts the voltage division formed by the resistors $R_1$ and $R_2$ into the reserved voltage $V_{ST}$. On the other hand, when the switch 230 is turned off, the capacitor $C_1$ discharges the voltage division stored therein to the resistor $R_2$ so as to switch the indication signal $S_{ID}$ to the second level L2. Moreover, because the capacitance of the capacitor $C_2$ is much larger than that of the capacitor $C_1$, the regulator 410 can still output the reserved voltage $V_{ST}$ for a predetermined time $T_P$ when the switch 230 is turned off.

Figure 5:
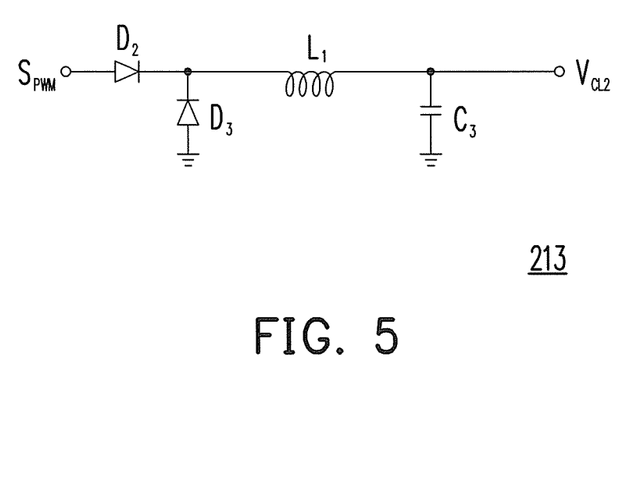
FIG. 5 is a detailed circuit diagram of a pulse control unit according to an embodiment of the present invention.

FIG. 5 is a detailed circuit diagram of a pulse control unit according to an embodiment of the present invention. Referring to FIG. 5, the pulse control unit 213 includes diodes $D_2 \sim D_3$, an inductor $L_1$, and a capacitor $C_3$. The anode of the diode $D_2$ is coupled to the microprocessor 212. The cathode of the diode $D_3$ is coupled to the cathode of the diode $D_2$, and the anode thereof is coupled to the ground. The first terminal of the inductor $L_1$ is coupled to the cathode of the diode $D_2$, and the second terminal thereof is used for generating the control voltage $V_{CL2}$. The first terminal of the capacitor $C_1$ is coupled to the second terminal of the inductor $L_1$, and the second terminal thereof is coupled to the ground.

Referring to FIG. 5 again, the modulation signal $S_{PWM}$ is converted into a pulse DC signal through the rectification of the diodes $D_2$ and $D_3$. After that, the low pass filter formed by the inductor $L_1$ and the capacitor $C_3$ captures the DC portion of the pulse DC signal and generates the control voltage $V_{CL2}$ accordingly. Because the waveform of the pulse DC signal is determined by the duty cycle of the modulation signal $S_{PWM}$, the level of the control voltage $V_{CL2}$ changes along with the duty cycle of the modulation signal $S_{PWM}$. In other words, the pulse control unit 213 can regulates the level of the control voltage $V_{CL2}$ according to the duty cycle of the modulation signal $S_{PWM}$.

Figure 6:
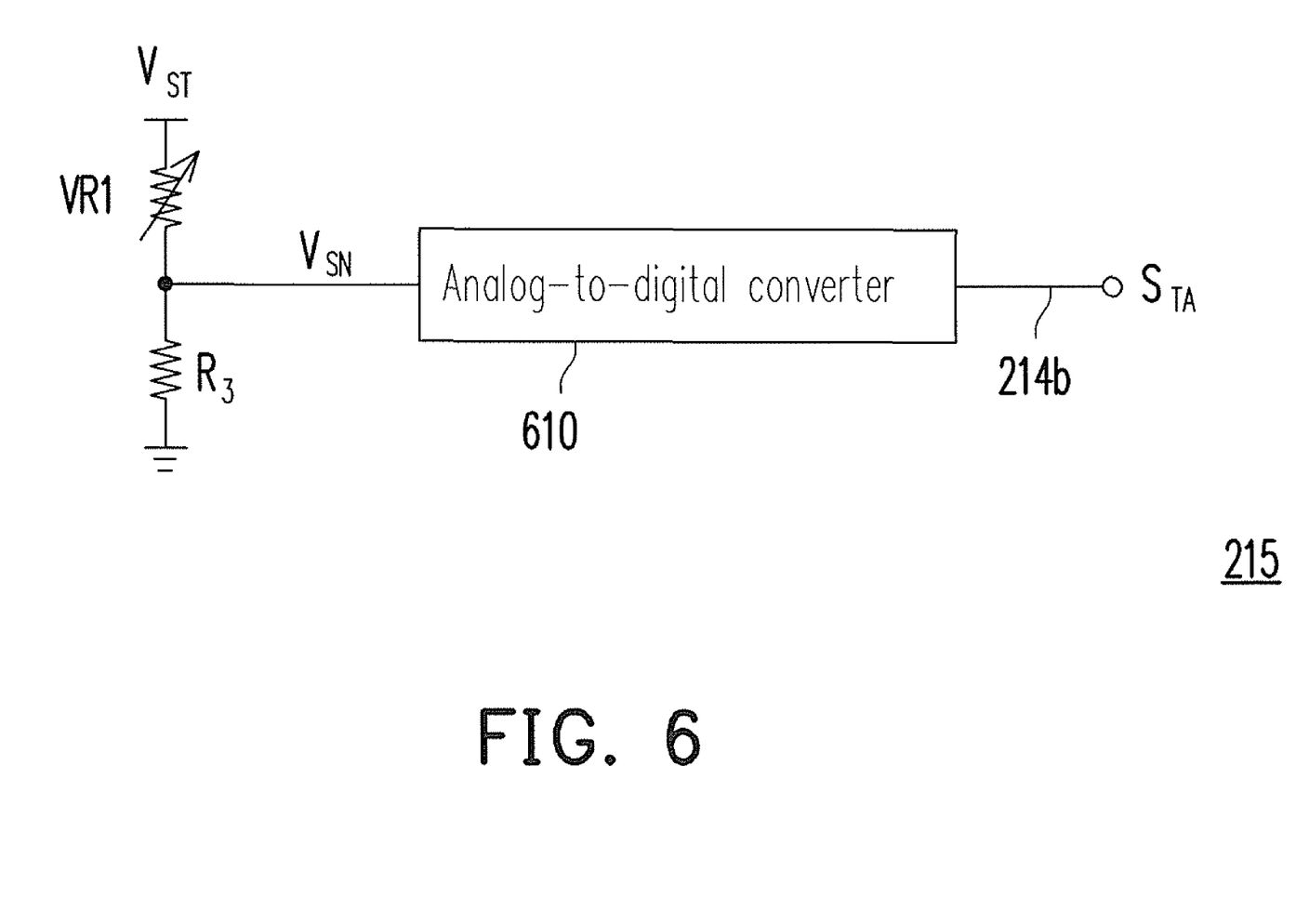
FIG. 6 is a detailed circuit diagram of an over-temperature protection unit according to an embodiment of the present invention.

FIG. 6 is a detailed circuit diagram of an over-temperature protection unit according to an embodiment of the present invention. Referring to FIG. 6, the over-temperature protection unit 215 includes a thermal resistor $VR_1$, a resistor $R_3$, and an analog-to-digital converter (ADC) 610. The first terminal of the thermal resistor $VR_1$ is coupled to the reserved voltage $V_{ST}$. The first terminal of the resistor $R_3$ is coupled to the second terminal of the thermal resistor $VR_1$, and the second terminal thereof is coupled to the ground. In addition, the ADC 610 is coupled between the second terminal of the thermal resistor $VR_1$ and the signal line 214b.

Referring to FIG. 6 again, the reserved voltage $V_{ST}$ is converted into a sensing voltage $V_{SN}$ through the division of the thermal resistor $VR_1$ and the resistor $R_3$. After that, the ADC 610 converts the sensing voltage $V_{SN}$ into a digital signal and generates the temperature alarm signal $S_{TA}$. It should be noted that the resistance of the thermal resistor $VR_1$ decreases along with the increase of the temperature of the electrical equipment 220 so that the sensing voltage $V_{SN}$ is also changed when the temperature of the electrical equipment 220 is too high. Thus, the ADC 610 can generate the corresponding temperature alarm signal $S_{TA}$ according to the level of the sensing voltage $V_{SN}$.

In overview, an energy storage unit is adopted in the present invention and which allows the load control module to operate for a predetermined time even when the switch is turned off. Moreover, the energy storage unit switches the level of an indication signal according to the on/off state of the switch. Accordingly, the microprocessor can regulate the duty cycle of a modulation signal through different control methods respectively within and without a fine tuning time according to the level of the indication signal. Thereby, the load control module in the present invention can generate a control voltage having different levels according to the switching time point and the switching speed of the switch so as to achieve a diversified control function.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims and their equivalents.

What is claimed is:

1. A load control module, suitable for an electrical equipment, wherein the electrical equipment is coupled to a terminal of a switch, and the other terminal of the switch receives a supply voltage, the load control module comprising:

an energy storage unit, coupled to the terminal of the switch, wherein the energy storage unit converts the supply voltage when the switch is turned on so as to output a reserved voltage and an indication signal having a first level, and the energy storage unit constantly outputs the reserved voltage for a predetermined time and switches the indication signal to a second level when the switch is turned off;

a microprocessor, coupled to the energy storage unit, wherein the microprocessor is activated according to the reserved voltage and constantly increases the duty cycle of a modulation signal within a fine tuning time until the duty cycle of the modulation signal reaches an optimal duty cycle or the indication signal is switched to the second level, and the microprocessor also switches the duty cycle of the modulation signal to one of a plurality of predetermined duty cycles according to the indication signal having the second level without the fine tuning time; and a pulse control unit, coupled to the microprocessor and the electrical equipment, wherein the pulse control unit regulates the level of a control voltage according to the duty cycle of the modulation signal and outputs the control voltage for regulating the characteristic parameters of the electrical equipment.

2. The load control module according to claim 1, wherein the energy storage unit comprises:
   a first diode, having an anode coupled to the switch;
   a first resistor, having a first terminal coupled to a cathode of the first diode and a second terminal for generating the indication signal;
   a second resistor, having a first terminal coupled to the second terminal of the first resistor and a second terminal coupled to the ground;
   a first capacitor, having a first terminal coupled to the second terminal of the first resistor and a second terminal coupled to the ground;
   a regulator, coupled to the second terminal of the first resistor for generating the reserved voltage; and
   a second capacitor, having a first terminal coupled to the regulator and a second terminal coupled to the ground.

3. The load control module according to claim 1, wherein the pulse control unit comprises:
   a second diode, having an anode coupled to the microprocessor;
   a third diode, having a cathode coupled to a cathode of the second diode and an anode coupled to the ground;
   an inductor, having a first terminal coupled to the cathode of the second diode and a second terminal for generating the control voltage; and
   a third capacitor having a first terminal coupled to the second terminal of the inductor and a second terminal coupled to the ground.

4. The load control module according to claim 1 further comprising:
   a bus, having a first signal line, a second signal line, and a third signal line, wherein an end of each of the first signal line to the third signal line is coupled to the microprocessor, and the microprocessor resets the fine tuning time, the optimal duty cycle, and the predetermined duty cycles according to a signal transmitted via the first signal line.

5. The load control module according to claim 4 further comprising:
   an over-temperature protection unit, coupled to the energy storage unit and the other end of the second signal line, wherein the over-temperature protection unit is activated according to the reserved voltage and detects the temperature of the electrical equipment to generate a temperature alarm signal,
   wherein the microprocessor determines whether to re-regulate the duty cycle of the modulation signal according to the temperature alarm signal.

6. The load control module according to claim 5, wherein over-temperature protection unit comprises:
   a thermal resistor, having a first terminal coupled to the reserved voltage;
   a third resistor, having a first terminal coupled to a second terminal of the thermal resistor and a second terminal coupled to the ground; and
   an analog-to-digital converter (ADC), coupled between the second terminal of the thermal resistor and the second signal line for generating the temperature alarm signal.

7. The load control module according to claim 4, wherein the electrical equipment provides a light source, and the brightness of the light source changes along with the level of the control voltage, and the load control module further comprises:
   a brightness correction unit, coupled to the energy storage unit and the other end of the third signal line, wherein the brightness correction unit detects a moving object in and the brightness of the environment around the electrical equipment by using an internal sensor device and generates a brightness tuning signal according to the detection result,
   wherein the microprocessor automatically regulates the duty cycle of the modulation signal according to the brightness tuning signal so as to allow the brightness of the light source to change based on a specific percentage.

8. The load control module according to claim 7, wherein the sensor device comprises a photo sensor and an infrared sensor.

9. The load control module according to claim 1 further comprising a feedback unit coupled between the microprocessor and the pulse control unit, wherein the feedback unit generates a corresponding feedback signal according to the level of the control voltage, and the microprocessor determines whether the pulse control unit operates normally according to the feedback signal.

10. The load control module according to claim 1, wherein the microprocessor performs a reset operation when the reserved voltage reaches a predetermined level.

* * * * *